G. H. GLENN.
TRACTOR ATTACHMENT.
APPLICATION FILED JUNE 26, 1920.

1,362,861.

Patented Dec. 21, 1920.

INVENTOR:
Gorman H. Glenn.

ATTORNEYS.

UNITED STATES PATENT OFFICE.

GORMAN H. GLENN, OF DURHAM, NORTH CAROLINA.

TRACTOR ATTACHMENT.

1,362,861.  Specification of Letters Patent.  Patented Dec. 21, 1920.

Application filed June 26, 1920. Serial No. 392,115.

*To all whom it may concern:*

Be it known that I, GORMAN H. GLENN, a citizen of the United States, residing at Durham, in the county of Durham and State of North Carolina, have invented new and useful Improvements in Tractor Attachments, of which the following is a specification.

This invention relates to agricultural tractors and its object is to provide the same with an attachment to enable the motor thereof to serve as a power source for the other machinery.

The object stated is attained by equipping one of the driven or traction wheels with a belt pulley, the machine being jacked up to take said wheel clear of the ground.

The pulley can be readily attached to the traction wheel, or removed therefrom, and it consists in a novel combination and arrangement of parts to be hereinafter described and claimed.

In order that the invention may be better understood, reference is had to the accompanying drawing forming a part of this specification, and in said drawing, Figure 1 is an elevation of a fragment of a tractor showing the application of the invention thereto;

Figures 1, 3:
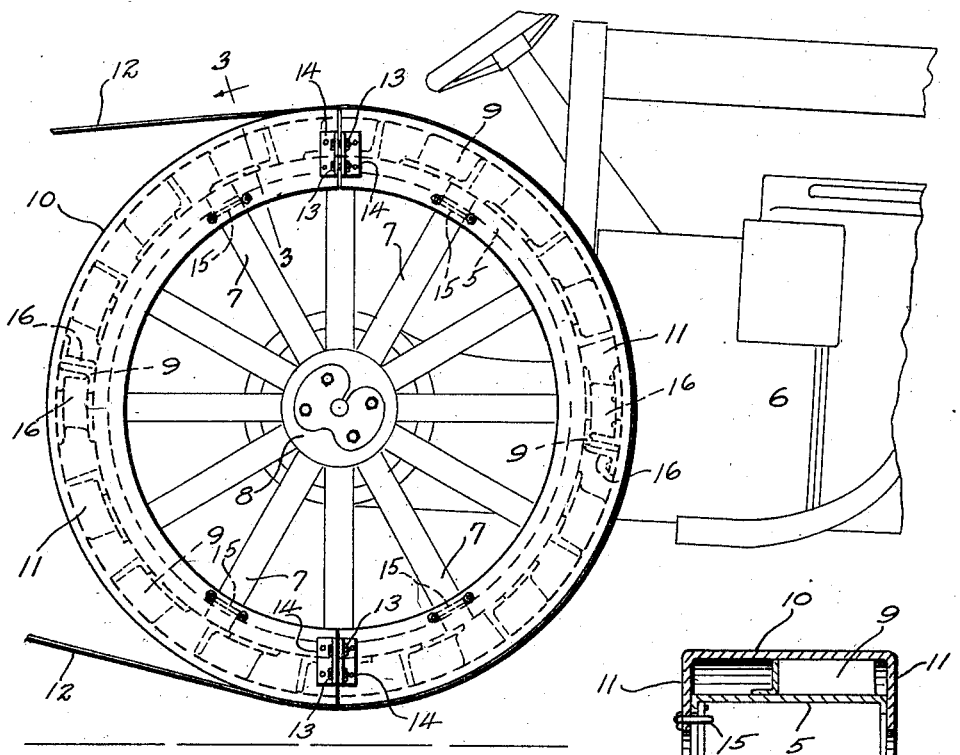
Fig. 3 is an enlarged cross-section on the line 3—3 of Fig. 1.
Figure 2:
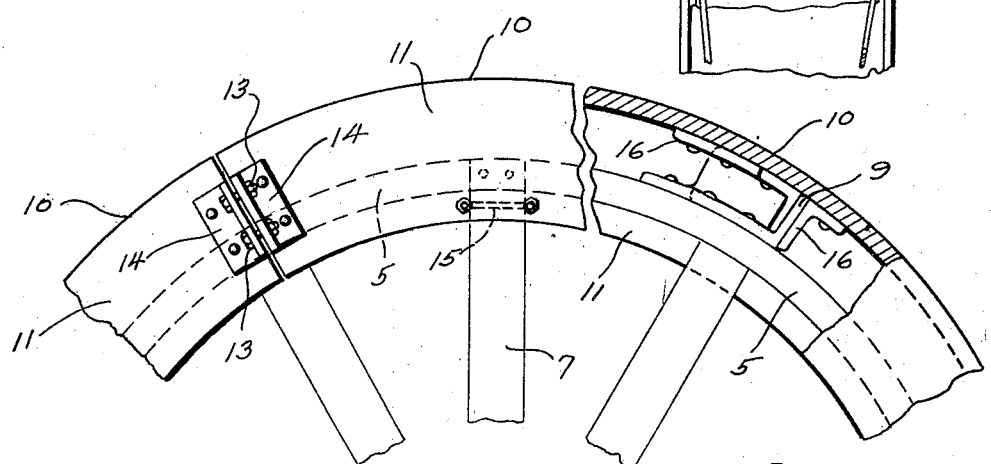
Fig. 2 is an elevation of a fragment of the pulley, and partly in section.

Referring specifically to the drawing, 5 denotes the rim of one of the traction or propelling wheels of a tractor 6. This rim is carried by spokes 7 radiating from a hub 8, and its outer surface is fitted with the usual obliquely extending traction cleats 9.

The pulley attachment for enabling the motor of the tractor to serve as a power source for driving other machinery, comprises two semicircular sections, which, when they are assembled on the traction wheel as shown, form a complete belt pulley. Each pulley section is a metal plate 10 forming a pulley rim, and having lateral flanges 11 at its edges. The pulley sections encircle the rim 5 externally and their width is such that the rim seats between the flanges 11, the latter being inturned for this purpose. The plates 10 do not seat directly on the outer periphery of the rim 5, as this is prevented by the outstanding cleats 9, but they seat on the cleats as clearly shown in the drawing and they completely cover the same. The wheel is thus given a smooth surface so that a belt 12 may be applied, as shown in Fig. 1, the same passing around the pulley rim formed by the plates 10.

The pulley sections are fastened together at their ends by bolts 13 passing through angle plates 14 riveted or otherwise secured to the sections. This fastening is a detachable one so that the sections may be assembled on the wheel, and when taken off they can be left separated to take up less storage room.

The fastening between the pulley sections and the traction wheel is made by U-bolts 15 carried by the flanges 11 and passing around the spokes 7. Any suitable number of these U-bolts may be provided.

An additional fastening means for the pulley sections is provided, the same consisting of cleats 16 mounted in pairs on the inner surface of the pulley rim plates 10, and so spaced and obliquely positioned that they straddle the cleats 9. One pair of cleats for each pulley section usually suffices for preventing the same from creeping around on the traction wheel.

I claim:

1. The combination with a traction wheel having its rim fitted with outstanding traction cleats; of a pulley attachment comprising rim members encircling the wheel and having marginal flanges between which the wheel rim seats, fasteners carried by said flanges and detachably engageable with the wheel, and cleats on the inside of the rim members straddling the traction cleats.

2. The combination with a traction wheel having its rim fitted with outstanding traction cleats; of a pulley attachment comprising rim members encircling the wheel, means for anchoring said members to the wheel, and cleats on the inside of the rim members straddling the traction cleats.

3. The combination with a traction wheel having its rim fitted with outstanding traction cleats; of a pulley attachment comprising rim members separably connected and encircling the wheel, means for anchoring said members to the wheel, and cleats on the inside of the rim members straddling the traction cleats.

In testimony whereof I affix my signature.

GORMAN H. GLENN.